(12) United States Patent
Tsai (10) Patent No.: US 6,625,324 B1
(45) Date of Patent: Sep. 23, 2003

(54) APPARATUS AND METHOD FOR PROVIDING COMPENSATION BITS FOR POST IMAGE PROCESSING

(75) Inventor: Jewel Tsai, Hsinchu (TW)

(73) Assignee: Mustek Systems Inc. (TW)

( * ) Notice: Subject to any disclaimer, the term of this patent is extended or adjusted under 35 U.S.C. 154(b) by 0 days.

(21) Appl. No.: 09/338,225

(22) Filed: Jun. 22, 1999

(51) Int. Cl.[7] .............................. G09G 5/02; G06K 9/40; H04N 1/46
(52) U.S. Cl. ...................... 382/254; 382/254; 345/605; 358/524
(58) Field of Search .............................. 358/3.01, 3.23, 358/519, 523, 522, 448, 244, 447, 524, 426.1, 445; 708/209; 345/600, 601, 605; 382/254, 251, 274

(56) References Cited

U.S. PATENT DOCUMENTS

| | | | | |
|---|---|---|---|---|
| 5,408,249 A | * | 4/1995 | Wharton et al. ............ | 345/690 |
| 5,526,296 A | * | 6/1996 | Nakahara et al. ........... | 708/209 |
| 5,907,370 A | * | 5/1999 | Suzuki et al. ............... | 348/607 |
| 6,181,826 B1 | * | 1/2001 | Weldy et al. ............... | 382/240 |
| 6,292,168 B1 | * | 9/2001 | Venable et al. ............. | 345/605 |
| 6,424,748 B1 | * | 7/2002 | Ting-Shan .................. | 382/254 |
| 2001/0026283 A1 | * | 10/2001 | Yoshida et al. ............. | 209/317 |

* cited by examiner

*Primary Examiner*—Kimberly A. Williams
*Assistant Examiner*—Melanie Vida (57) ABSTRACT

The present invention provides an apparatus and method for providing extra bits for post image processing, thereby to increase the image bit depth and compensate the loss of image accuracy. The present invention operates on multiple least insignificant bits of the post-pixel memory device and the pre-pixel memory device to generate compensation bits. The compensation bits can be appended to the rightmost bit positions of the current pixel. With the compensation bits, the image bit depth can be increased. Consequently, the image will be processed more accurately after post processing. Moreover, since the extended bitstream preserves the complete bits of the original pixel, therefore the accuracy of the original image will not be affected by the compensation bits.

8 Claims, 7 Drawing Sheets

APPARATUS AND METHOD FOR PROVIDING COMPENSATION BITS FOR POST IMAGE PROCESSING

BACKGROUND OF THE INVENTION

A. Field of the Invention

The present invention relates to an apparatus and method for image processing, especially to an apparatus and method adaptable for an 8-bit or a 10-bit AID converter to provide multiple extra bits for post image processing, thereby to improve the color fidelity of the digital image signals after post processing.

B. Description of the Prior Art

It is known that the precision of tone for a scanned image is determined by the image bit depth. The scanners currently available in the market present various specifications of image bit depth, such as 24-bit color, 30-bit color, 36-bit color, or even 42-bit color. These scanners differ in the capability of Analog/Digital converters (hereinafter AID converter). An 8-bit AID converter can generate 256 ($2^8$) colors for each channel, that is, 24-bit color images. In contrast, a 12-bit AID converter can generate 4096 ($2^{12}$) colors for each channel. Nevertheless, according to the nowadays technology, regardless of the capability of the AID converter, the images shown on the screen or sent to the printer are limited to 8-bit of data for each channel. Moreover, most image processing software can only accept 8-bit of data for each channel. Accordingly, the extra bits other than the 8-bit data obtained from the AID converter will seem redundant when they are forwarding to the host computer. Once the post processing is required for the digital image signals, such as Gamma correction or highlight/shadow adjustment, those extra bits may become very useful.

Figure 1A:
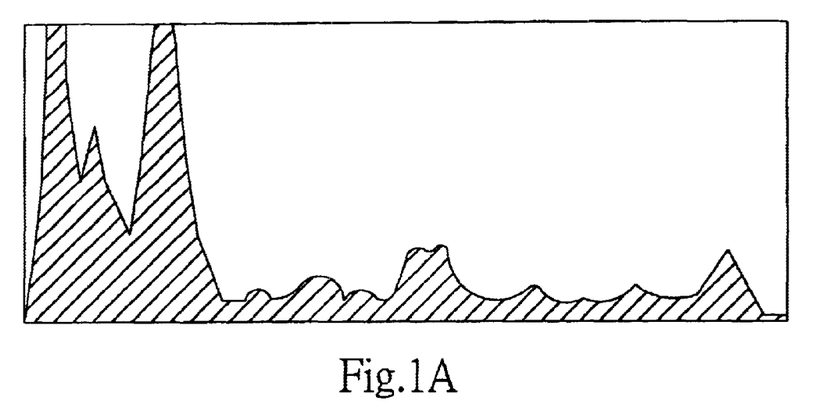
FIG. 1A is a histogram showing a channel of an original scanned image data.

Take Gamma correction as an example, Gamma correction is for increasing the color levels of a pixel so as to brighten the image and enhance the visibility of the pixels, especially for those dark ones. Refer to FIG. 1A, it is a histogram illustrating an original image which has not been processed yet. Since the original image is unprocessed, so it can show all the 256 colors. The histogram representing this situation is a continuous diagram. In that case, if all three channels can distinguish 256 colors, then the 24-bit color image can have 16777216 colors (256×256×256) in it.

Figure 1B:
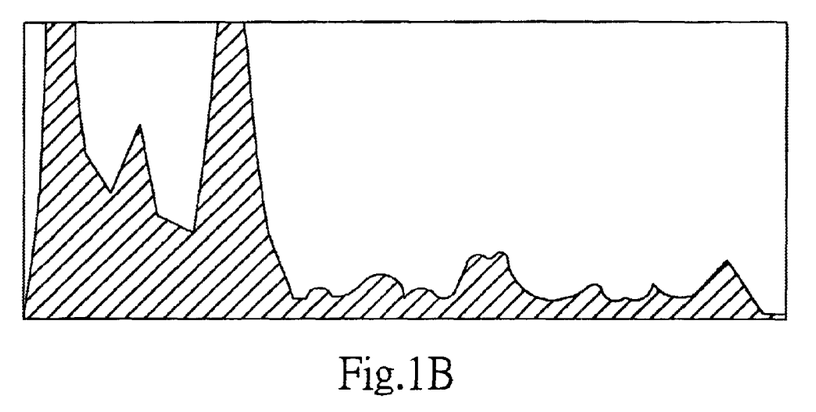
FIG. 1B is a histogram showing a channel of a processed scanned image data after Gamma correction using Gamma value of 1.4.
Figure 1C:
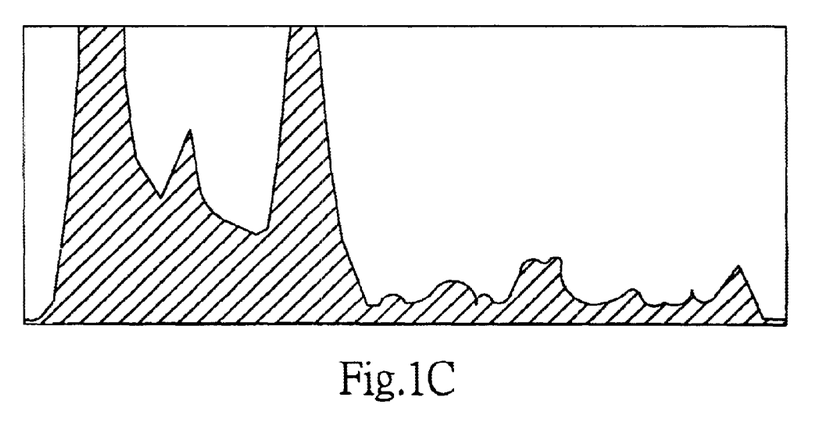
FIG. 1C is a histogram showing a channel of a processed scanned image data after Gamma correction using Gamma value of 1.8.

FIG. 1B and FIG. 1C are histograms showing the same channel of the same scanned image as FIG. 1A after being processed by Gamma correction. The Gamma value for FIG. 1B is 1.4. On the other hand, the Gamma value for FIG. 1C is 1.8. Refer to FIG. 1B, it shows that only 225 colors out of 256 colors can be shown. In that case, the histogram is discontinuous. In other words, the 24-bit colors can only present 11390625 (225×225×225) colors which are only 67.89% of 16777216. Refer to FIG. 1C, the histogram shows that only 203 colors out of 256 colors can be shown. The 24-bit colors of FIG. 1C can only present 8365427 (203×203×203) colors, which are only 49.86% of 16777216.

Basically, the above mentioned problem can be solved by using extra bits in post processing. The current technology provides two approaches: a complete computation approach, and a simplified computation approach. The complete computation approach takes the entire image signal output of the scanner and leaves the complicated computation to the host computer for processing. The complete computation usually needs large buffer memory size, and complicated computation circuit implementation. Although this approach can guarantee the accuracy of the image data, the data size is so large that the speed of computation as well as data transfer gets very slow. For this reason, this approach is not commercially competitive considering the cost, memory and resource utilization.

Another simplified computation approach is that the scanner only outputs 8-bit data to the host computer for post processing. The image enhancement is left for the software to process. In most cases, this method can generate extra bits for a current pixel by calculating an average of the neighboring pixels around a current pixel, or by calculating and assigning weights to the neighboring pixels before post processing. However, the disadvantage is that these computations may affect the system performance, especially when processing images of very large sizes. Moreover, the average or weights will affect the accuracy of the original image data. If not handled properly, it may cause the image to be blurred.

SUMMARY OF THE INVENTION

Accordingly, it is an object of the present invention to provide an apparatus and method for providing compensation bits for post processing. The compensation bits are extra bits attached to the rightmost insignificant bit positions of the original pixel to increase the image bit depth of the original pixel, thereby to compensate the loss of accuracy after Gamma correction. Moreover, the hardware implementation of the apparatus of the present invention is so simple that it will not increase the manufacturing cost, nor affect post processing speed while still can preserve the accuracy of the original pixels.

The apparatus of the present invention mainly comprises: a post-pixel memory device, a current pixel memory device, a shifting device, a pre-pixel memory device, a QBET (Quick Bit Extension Technology, herein after QBET) operating device, and a Join device. The post-pixel memory device is coupled to an analog/digital converter for receiving the output of the analog/digital converter. The two least significant bits of the output of the post-pixel memory device will be forwarded to the QBET operating device. The current pixel memory device is coupled to the post-pixel memory device for receiving the output of the post-pixel memory device. The output of the current pixel memory device will be forwarded to the shifting device and the pre-pixel memory device. The two least significant bits of the pre-pixel memory device will be forwarded to the QBET operating device.

During the same time, the shifting device will perform left-shifting two bits on the bits received. After that, the left-shifted bits will be forwarded to the Join device. The QBET operating device can generate the compensation bits by computing the two least significant bits or by looking up a built-in table. The compensation bits will then be forwarded to a Join device. Then, the Join device appends the two compensation bits to the output of the shifting device. Consequently, the current pixel will be extended with two bits. Since the extended bitstream contains the entire bits of the original pixel, therefore the accuracy of the original pixel can be preserved. Moreover, the extended two bits can increase the image bit depth, and compensate the loss of accuracy after post processing.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 2A:
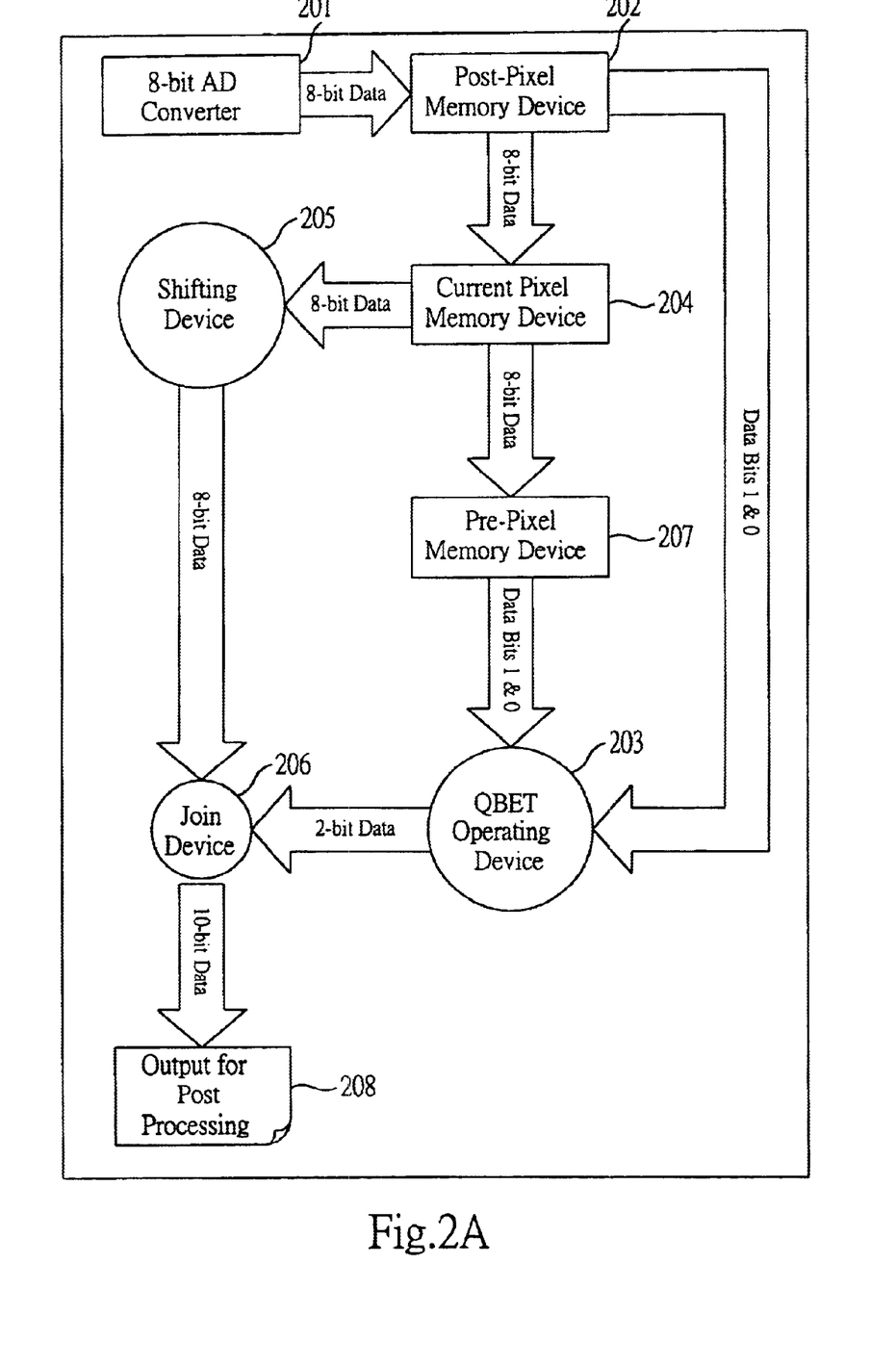
FIG. 2A is a functional block diagram showing the inventive two-bit compensation bits provider adaptable for 8-Bit analog/digital converter.

To overcome the disadvantages of the conventional method which can only process 8-bit data output of the A/D converter or software, the present invention provides an apparatus and method for providing multiple compensation bits for the post processing so as to increase the image bit depth. The compensation bits are computed by a QBET (Quick Bit Extension Technology, herein after QBET) operating device which is a -bitwise operator. Refer to FIG. 2A, an 8-bit A/D converter 201 outputs 8-bit image data to post-pixel memory device 202 for storing the pixel subsequent to the current pixel. The least significant bits bit-0 and bit-1 of the output of the post-pixel memory device 202 will be forwarded to the QBET operating device 203. The original 8-bit image data will be forwarded to the current pixel memory device 204. During this time, the 8-bit image data output from the current pixel memory device 204 will be forwarded to the shifting device 205, which can be implemented as a shift register, for performing left shift with 2 bits. The data output of the shifting device 205 will be extended to 10 bits and will be forwarded to the Join device 206, which can be implemented as an OR gate. The 8-bit image data output from the current pixel memory device 204 will be forwarded to pre-pixel memory device 207. The pre-pixel memory device 207 outputs the least significant bits bit-0 and bit-1 of the 8-bit image data to the QBET operating device 203. The QBET operating device 203 takes the two least significant bits from the post-pixel memory device 202 and the two least significant bits from the pre-pixel memory device 207 as inputs, and generates two compensation bits to the Join device 206. The Join device 206 will append the two compensation bits to the bit-0 and bit-1 positions of the 10-bit bitstream. The 10-bit bitstream will then output for post image processing 208.

Figure 2B:
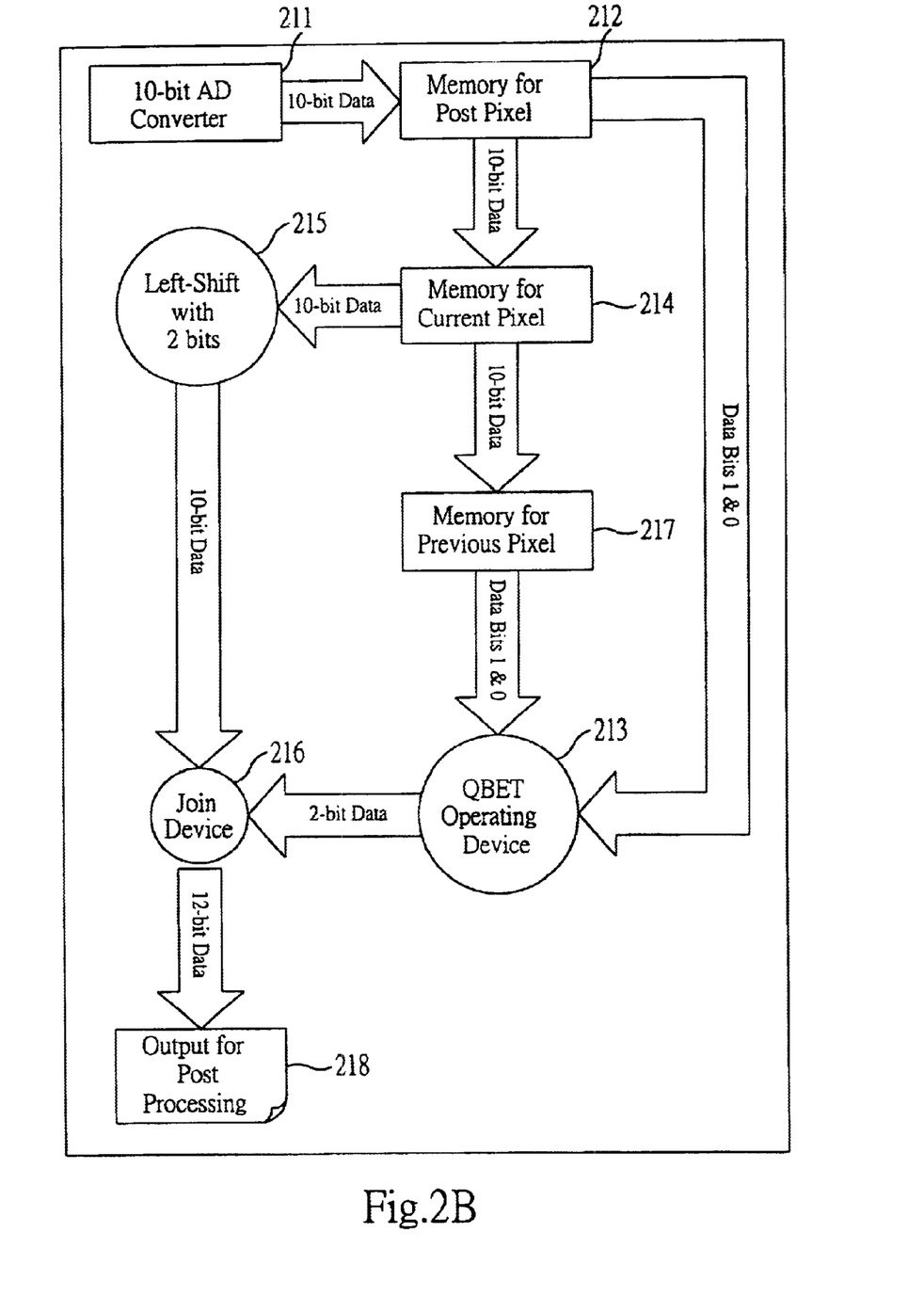
FIG. 2B is a functional block diagram, showing the two-bit compensation bits provider adaptable for 10-bit analog/digital converter.

The QBET operating device is also adaptable to 10-bit A/D converter, as illustrated in FIG. 2B. The difference between FIG. 2A and FIG. 2B is that the 10-bit A/D converter 211 will output 10-bit image data. Consequently, the original 8-bit data will be extended to 10-bit data. The data output of the current pixel memory device 214 will be 10 bits. After left-shifting 2 bits, the 10-bit data will be extended to 12-bit bitstream. However, the QBET operating device 213 only reads two least significant bits from the post-pixel memory device 212 and the other two least significant bits from the pre-pixel memory device 217 respectively for computing the compensation bits.

The two compensation bits will be sent to the join device 216 for appending to the bit-1 and bit-0 positions of the 12-bit bitstream of the shifting device 215. The entire 12-bit data until the join device 216 is joined will then be output for post processing 218. The 10-bit of the 12-bit data are image data of the original pixel.

Figure 3:
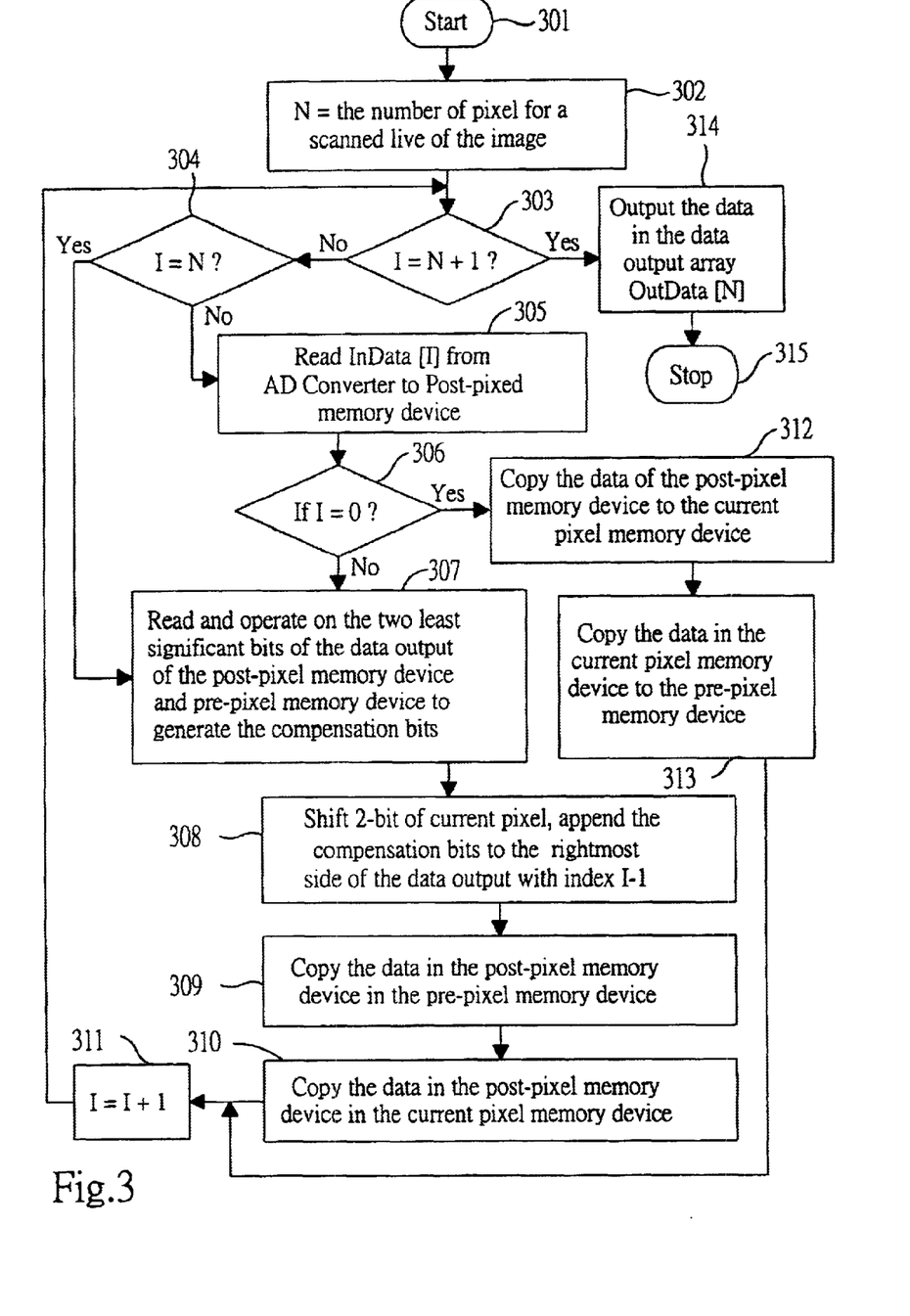
FIG. 3 is a flow chart showing the inventive method for providing compensation bits adaptable to 8-bit analog/digital converter.

The operation principle of the present invention is to provide an equal probability for the occurrence of various bit combinations. Thus, it can compensate the loss of accuracy and improve the tone of the image after post processing, thereby to improve the color fidelity of the image. Since the invention only operates on the two least significant bits, and the leftmost 8 or 10 bits are exactly the same as the original pixel, therefore the accuracy of the image data can be preserved. Refer to FIG. 3 for the QBET operating device adaptable to an 8-bit A/D converter for generating two compensation bits.

301: Start.

302: Set I=0, N=the number of pixels for a scanned line of the image.

303: Determine if I is equal to N+1 ? When I=N+1, go to step 314; otherwise go to step 304.

304: Determine if I is equal to N? If yes, go to step 307; if not, go to step 305.

305: Read the pixel I from the A/D converter to the post-pixel memory device.

306: Determine if I=0 ? When I=0, go to step 312; if not, go to step 307.

307: Read and operate the two sets of the two least significant bits of the data output of the post-pixel memory device and pre-pixel memory device respectively to generate the two-bit compensation bits.

308: When the data output of the current pixel memory device is left-shifted two bits, the two compensation bits will be appended to the extended bits which will be stored in a data output array [I−1].

309: Copy the data in the current pixel memory device into the pre-pixel memory device.

310: Copy the data in the post-pixel memory device to the current pixel memory device.

311: I=I+1. Go to step 303.

312: Copy the data of the post-pixel memory device to the current pixel memory device.

313: Copy the data in the current pixel memory device to the pre-pixel memory device, and go to step 311.

314: Output the data in the data output array OutData[N].

315: Stop.

Figure 4:
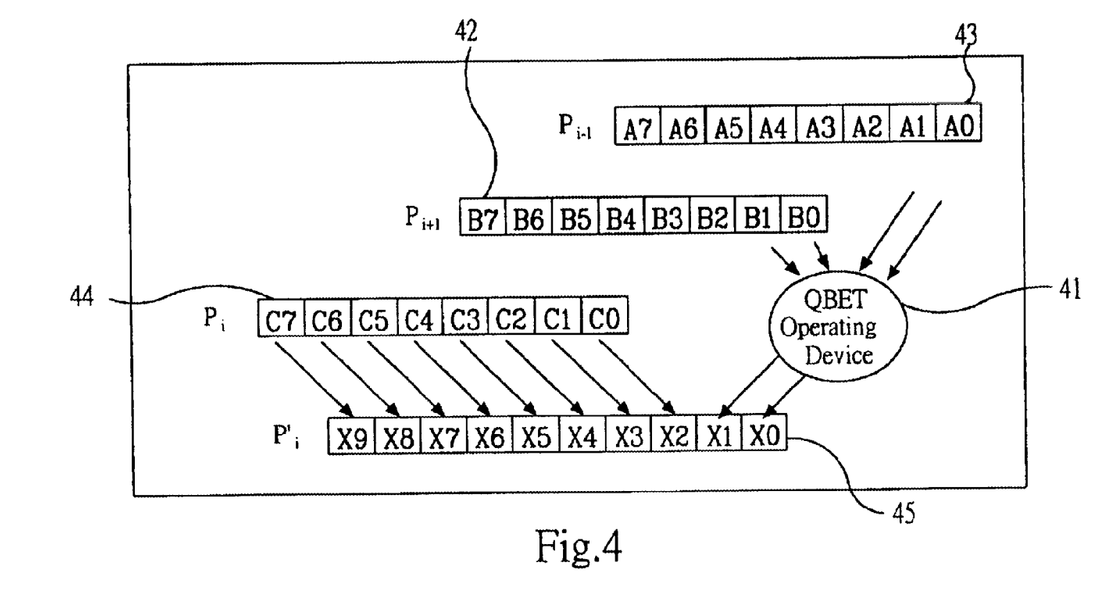
FIG. 4 is a schematic diagram showing the operations of the compensation bits provider according to a preferred embodiment of the present invention.

The operation flowchart of FIG. 3 can be illustrated in FIG. 4. The QBET operating device 41 reads the two least significant bits A1, A0 from the output Pi−1 43 of the pre-pixel memory device, and the two least significant bits B1, B0 from the output Pi+1 42 of the post-pixel memory device. The QBET operating device 41 operates on A1, A0 and B1, B0 to generate the compensation bits X1, X0. At the same time, the output Pi 44 of the current pixel memory device will be left-shifted two bits and become 10-bit bitstream Pi 45. The 8-bit of the 10-bitstream are image data of the original pixel. The compensation bits X1, X0 will be appended to the rightmost bits of the 8-bit data to form 10-bit data by the join device 206.

Figure 5:
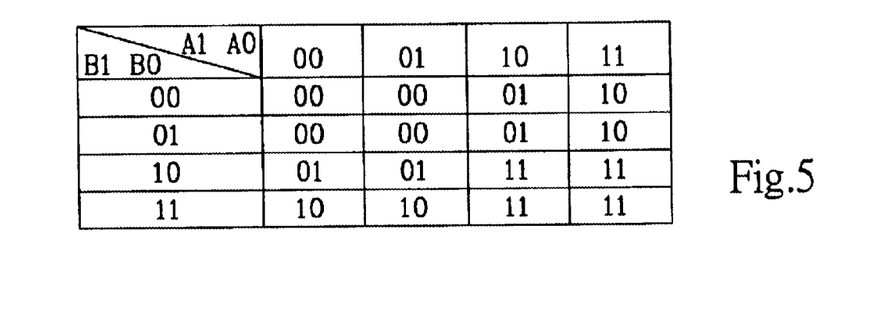
FIG. 5 is a lookup table for the compensation bits provider according to a preferred embodiment of the present invention.

The purpose of the QBET operating device is to provide an equal probability for various combinations of the compensation bits. Refer to the lookup table of FIG. 5. When the QBET operating device receives the two bits from the post-pixel memory device and pre-pixel memory device respectively, there are 16 possible combinations of the bits. According to the experiments, the effects will be best if each possible combination has the same chance of occurrence. For this reason, the operation of the operating device can have several computation results, as illustrated in FIG. 5. The bits from the top-left side to the lower-right side represents colors from dark to increasing bright. According to the table of FIG. 5, a logic circuit can be implemented as illustrated in FIG. 6.

Figure 6:
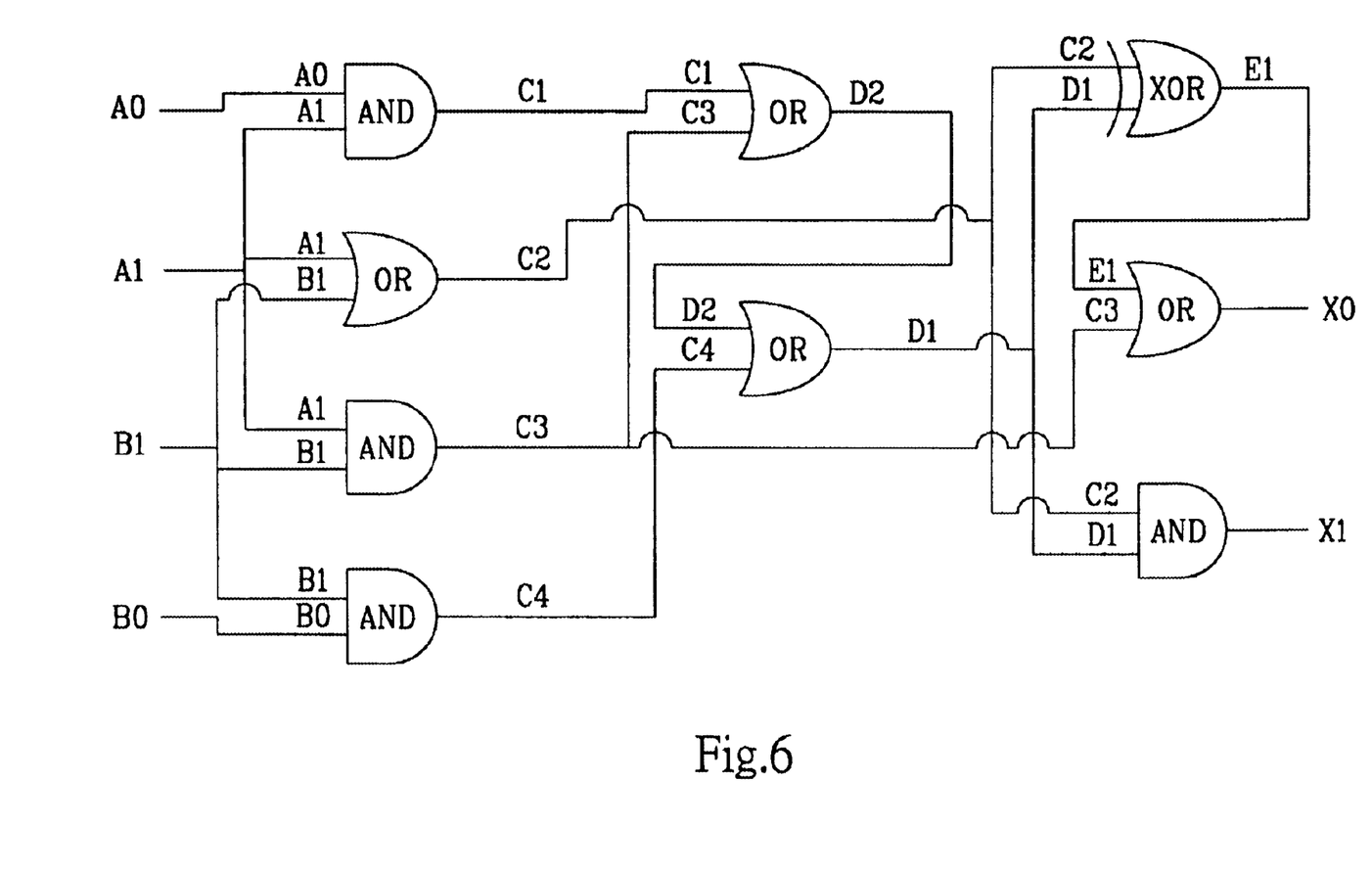
FIG. 6 is a logic circuit diagram showing the operating device of the compensation bits provider according to a preferred embodiment of the present invention.

With the lookup table of FIG. 5, the operator of FIG. 6 involves only two bitwise operations, that is, left shift two bits, an OR operation, and a 4×4 lookup table. The cost on such operation is very low in corresponding to the speed of the post processing. More importantly, in the extended 10-bits, the bits from the $9^{th}$ bit to the $2^{nd}$ bit is completely transferred from the $7^{th}$ bit to $0^{th}$ bit of the output of the current pixel memory device. These bits can preserve the original image data without being affected by the extended bit operation.

Figure 7:
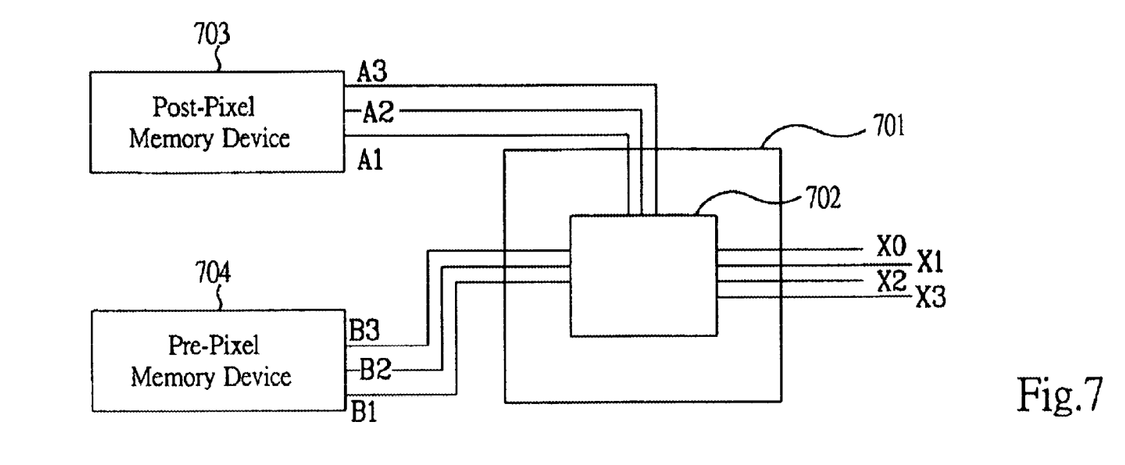
FIG. 7 is a functional block diagram showing the four-bit compensation bits provider adaptable for 8-bit analog/digital converter.

Moreover, the QBET operating device can be extended to 4 bits as shown in FIG. 7. The 4-bit QBET operating device 701 takes three of the four least significant bits, A3, A2, and A1 of the post-pixel memory device and three of the four least significant bits, B3, B2, and B1 of pre-pixel memory device to generate a 4-bit compensation bits X0, X1, X2, X3. It should be noted that the least significant bits of A0 and B0 is not employed in this case.

Figure 8:
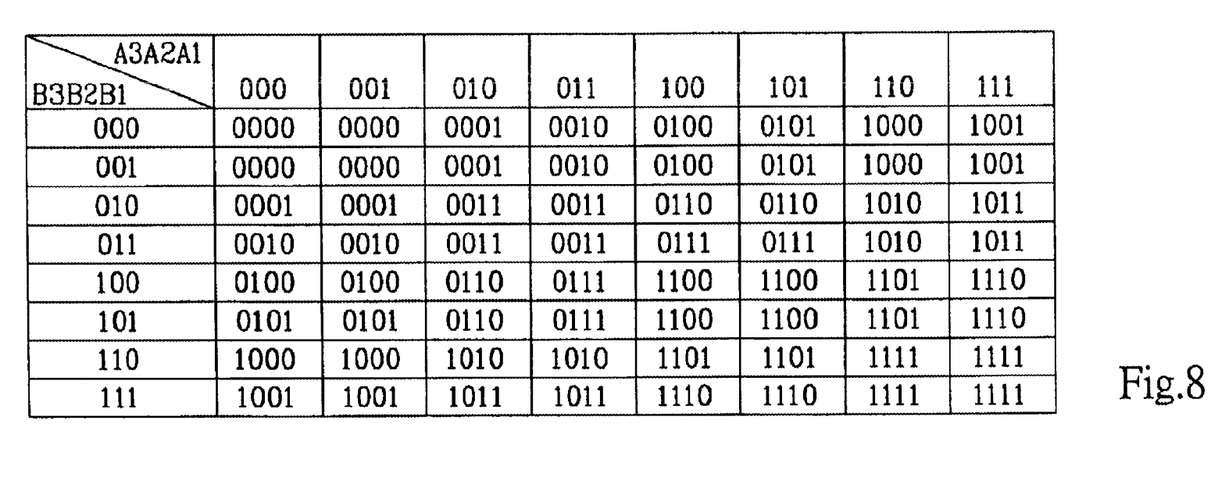
FIG. 8 is a lookup table for four-bit compensation bits provider according to a preferred embodiment of the present invention.

In this embodiment, the result of the QBET operating device 701 can be found by looking up the table 702 using the least three insignificant bits B3, B2, and B1 of pre-pixel memory device and the least three insignificant bits A3, A2, and A1 of the post-pixel memory device as indices respectively. The lookup table 702 is 8×8 as illustrated in FIG. 8. The combination and computation rules of FIG. 8 is the same as that of FIG. 5. The rule for building up the table is to provide the equal probability for the occurrence of each bit combination. The table as shown in FIG. 8 can be implemented as logic circuits. However, using a lookup table will be much faster.

The operations for the embodiment as shown in FIG. 8 involves also left shift 4 bits, an OR operation, and looking up an 8×8 table. According to the present invention, the number of compensation bits generated is insignificant to the computation speed. This advantage cannot be obtained by using other approaches such as computing the extra bits by averaging, or assigning weights to the neighboring pixels of a current pixel. More importantly, the $11^{th}$ bit to the $4^{th}$ bit of the bitstream generated is directed obtained from the $7^{th}$ to $0^{th}$ bits of the original bitstream. For this reason, the new bitstream can preserve the essential data of the original pixel. This is also considered as an advantage of the present invention.

The lookup table as shown in FIG. 5 and FIG. 8 is designed to provide an equal probability for the occurrence of each entry. Moreover, the characteristic for FIG. 5 and FIG. 8 is that the color entry is growing brighter from the up-left portion to the lower-right portion of the table. It should be understood that the arrangement as shown in FIG. 5 and FIG. 8 is only for the purpose of illustration. In practice, following the rules for building the table, there are still some possible combinations. For instance, in FIG. 5, the first row of the table can be modified as 00, 00, 01, 01, the second row as 00, 00, 10, 10, and the last two rows as 01, 10, 11, 11. The result produced will still be the same.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. An apparatus coupled to an analog/digital converter for providing compensation bits for post image processing comprising:

post-pixel memory means coupled to said analog/digital converter for receiving a bitstream output of said analog/digital converter;

current pixel memory means coupled to said post-pixel memory means for receiving a bitstream output of said post-pixel memory means;

means coupled to said current pixel memory means for left-shifting a plurality of bits for said bitstream output of said current pixel memory means;

pre-pixel memory means coupled to said current pixel memory means for receiving said bit stream output of said current pixel memory means; and operating means for receiving and operating on a plurality of least significant bits of said bitstream output of said post-pixel memory means and said pre-pixel memory means respectively to generate a plurality of compensation bits wherein said operating means comprises a table for recording a plurality of bit combinations of said compensation bits; and means for appending said plurality of compensation bits to said bitstream output of said left-shifting means.

2. The apparatus as claimed in claim 1, wherein said left-shifting means is for left-shifting two bits of said bitstream output of said current pixel memory means.

3. The apparatus as claimed in claim 1, wherein said left-shifting means is for left-shifting four bits of said bit stream output of said current pixel memory means.

4. The apparatus as claimed in claim 1, wherein the probability of the bit combinations in said table is equal.

5. The apparatus as claimed in claim 1, wherein said compensation bits of said operating means are two bits.

6. The apparatus as claimed in claim 1, wherein said operating means receives the least significant three bits other than the last bit from the bitstream output of said post-pixel memory means and said pre-pixel memory means respectively and then generates four bits of compensation bits.

7. A method for providing compensation bits for post image processing after receiving a bitstream output of an analog/digital converter, comprising the steps of:

reading a bitstream output of said analog/digital converter in sequence, and storing said bitstream output in a pre-pixel memory means, a current pixel memory means, and a post-pixel memory means respectively according to a sequential order;

left-shifting two bits of the bitstream output of said current pixel memory means;

computing the two least significant bits of said post-pixel memory means and said pre-pixel memory means as indices for looking up two-bit compensation bits in a table; and appending said two-bit compensation bits to said bitstream output of said left-shifted bitstream.

8. A method for providing compensation bits for post image processing after receiving a bit stream output of an analog/digital converter, comprising the steps of:

reading a bitstream output of said analog/digital converter in sequence, and storing said bitstream output in a pre-pixel memory means, a current pixel memory means, and a post-pixel memory means respectively according to a sequential order;

left-shifting four bits of the bitstream output of said current pixel memory means;

computing the three least significant bits of said post-pixel memory means and said pre-pixel memory means as indices for looking up a four-bit compensation bits in a table; and appending said four-bit compensation bits to said left-shifted bitstream.

* * * * *